Figure 1:
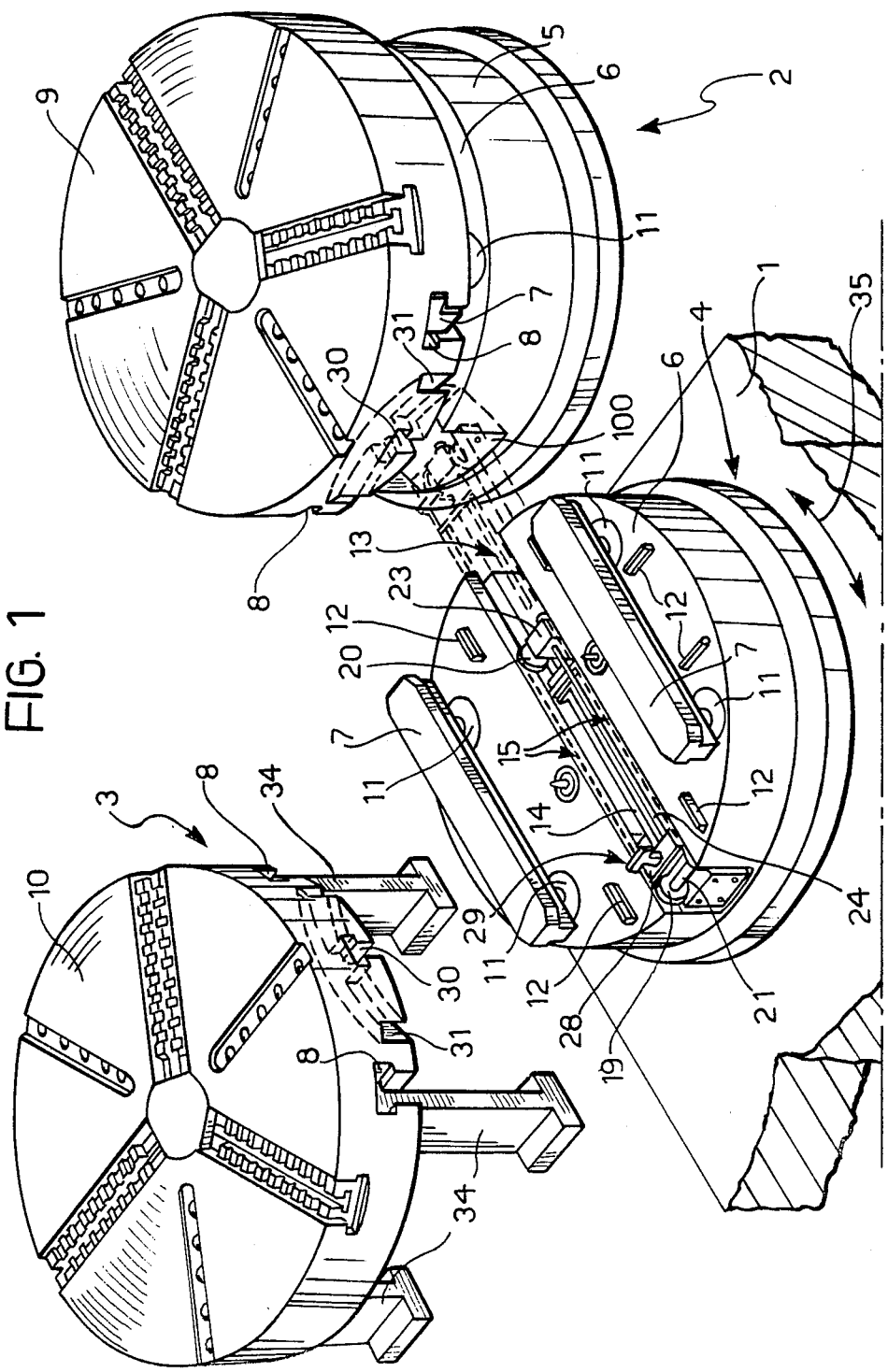

United States Patent [19]

Bertorello

[11] Patent Number: 4,712,283

[45] Date of Patent: Dec. 15, 1987

[54] SYSTEMS INCLUDING AT LEAST ONE VERTICAL TURNING MACHINE OR THE LIKE AND AT LEAST TWO AUXILIARY STATIONS

[75] Inventor: Mario Bertorello, Turin, Italy

[73] Assignee: Rotomors S.p.A., Orbassano, Italy

[21] Appl. No.: 702,458

[22] Filed: Feb. 19, 1985

[30] Foreign Application Priority Data

Dec. 7, 1984 [IT] Italy .................................. 68220 A/84

[51] Int. Cl.$^4$ ............................................ B23Q 41/02
[52] U.S. Cl. ........................................ 29/33 P; 29/563;
198/345; 198/339.1
[58] Field of Search ............. 29/33 P, 563, 564, 564.2,
29/564.7, 565, 566; 198/339, 345, 472; 414/751

[56] References Cited

U.S. PATENT DOCUMENTS

| | | | |
|---|---|---|---|
| 3,986,617 | 10/1976 | Blomquist | 29/563 X |
| 4,035,904 | 7/1977 | Ishizaka et al. | 29/563 |
| 4,181,211 | 1/1980 | Nishimura et al. | 198/339 |
| 4,309,600 | 1/1982 | Perry et al. | 29/33 P X |
| 4,373,840 | 2/1983 | Miller, Jr. | 198/472 X |
| 4,449,277 | 5/1984 | Hasegawa et al. | 29/33 P |
| 4,480,738 | 11/1984 | Mattson | 29/33 P X |
| 4,498,571 | 2/1985 | Nomura et al. | 29/33 P X |
| 4,565,480 | 1/1986 | Merk et al. | 414/751 X |

FOREIGN PATENT DOCUMENTS 1092333 12/1980 Canada .................................. 29/563

OTHER PUBLICATIONS

Vertical Turning Machine AC. 15 CNC with Pallet System.

Primary Examiner—Gil Weidenfeld
Assistant Examiner—Glenn L. Webb
Attorney, Agent, or Firm—Lahive & Cockfield

[57] ABSTRACT

A system including a vertical turning machine and at least two auxiliary stations, such as a control, loading and discharge station, and a waiting station, has a drive mechanism for moving the workpiece platforms (pallets) between respective equipment supports (pallet supports). The drive mechanism includes a hydraulic cylinder housed in a diametral through seat in the upper part of the turning machine pallet support and located between respective pallet supporting straight guides. It includes a T-shaped hook member projecting from a cursor, located close to one end of the seat, and fixed to upper passes of a pair of chains driven by sprockets which form part of a carriage. The carriage is fixed to the end of a piston shaft projecting from the hydraulic cylinder. The advance of the piston shaft causes the carriage to project partly outwardly from the perimeter of the pallet support towards an auxiliary station. The lower passes of the chains are fixed close to the end of the cylinder from which the pistion shaft projects. Hence, the cursor and the T-shaped member have a supplementary movement to that due to cylinder action. The T-shaped member fits in a T-shaped, short radial slot in the lower face of the pallet. The end portion of the slot intersects an arcuate, inverted U-shaped groove, the axis of curvature of which coincides with the axis of rotation of the turning machine pallet support. When the guides which support the pallet move upwardly, the T-shaped member can carry the pallet onto or thrust the pallet away from the pallet support of the turning machine.

12 Claims, 8 Drawing Figures

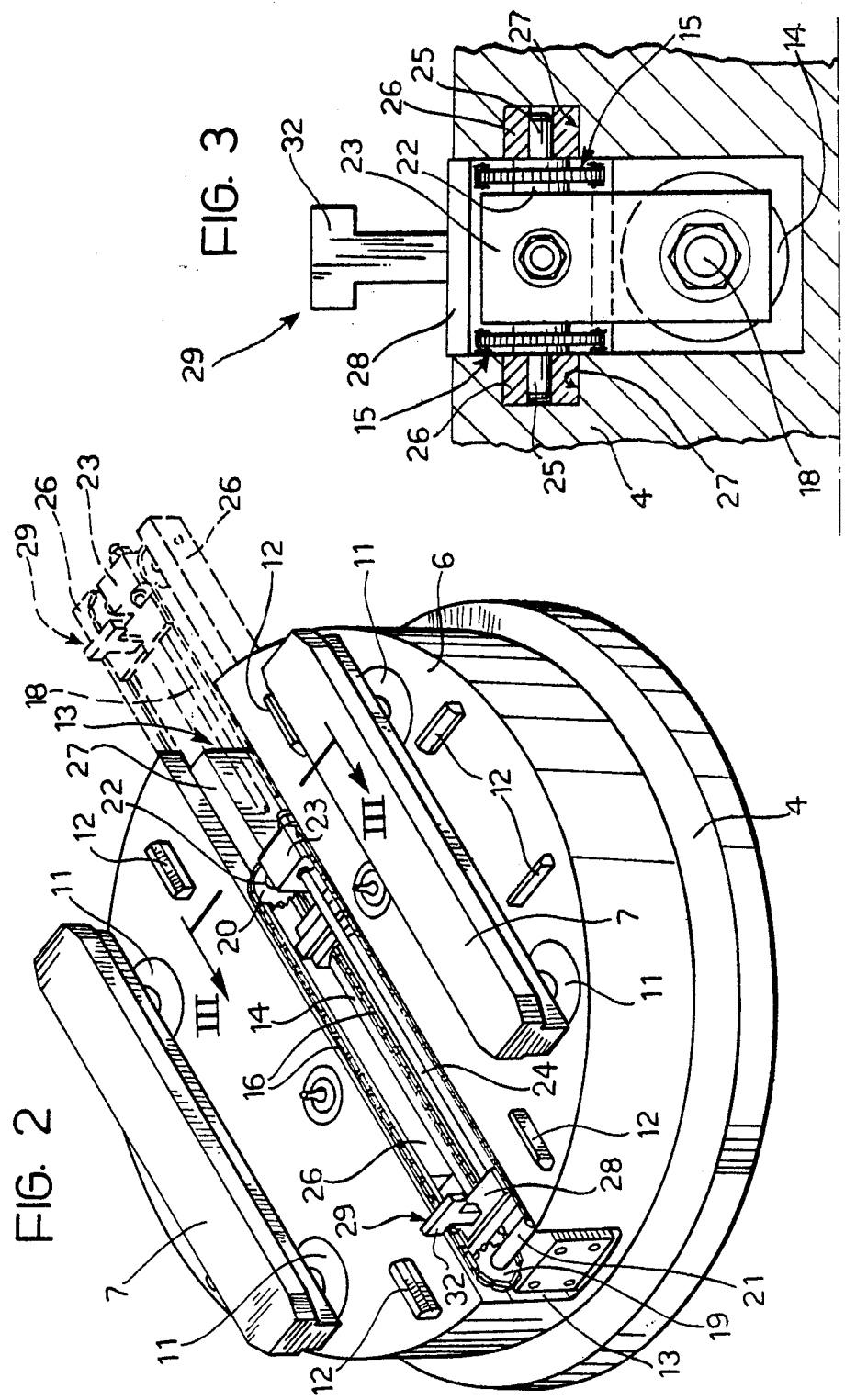

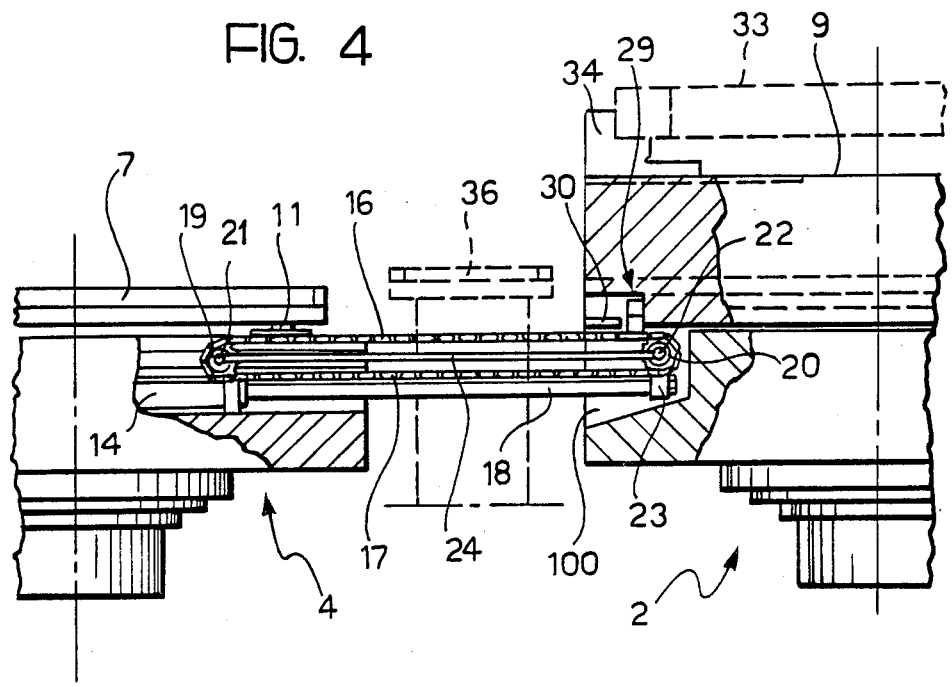
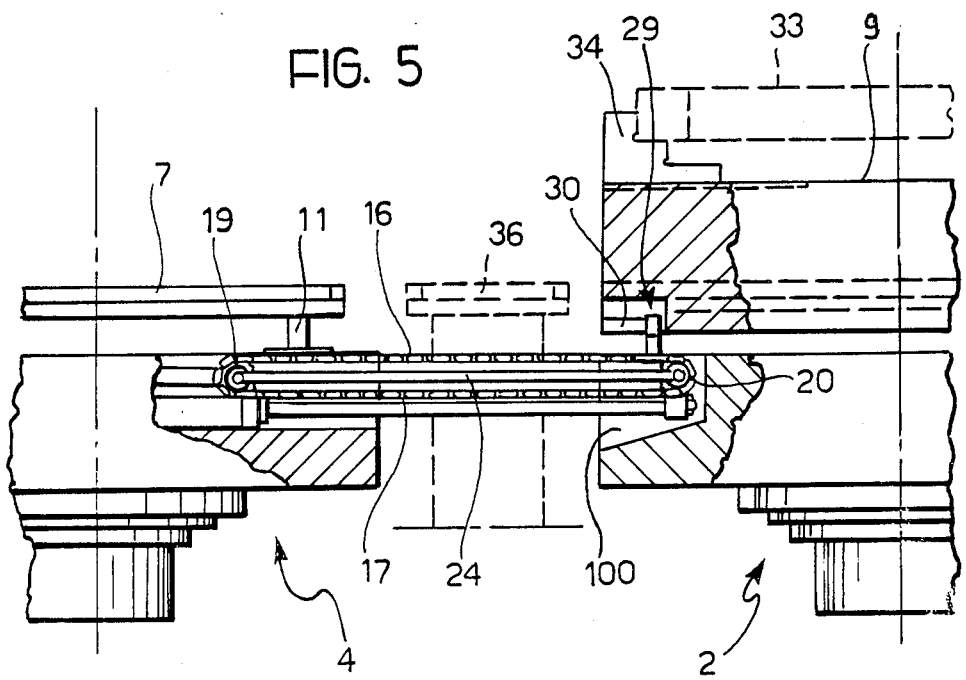

SYSTEMS INCLUDING AT LEAST ONE VERTICAL TURNING MACHINE OR THE LIKE AND AT LEAST TWO AUXILIARY STATIONS

The subject of the present invention is improvements in systems which include at least one vertical turning machine or like machine tool and at least two auxiliary stations, of the type in which the pieces being worked are mounted on pallets having pairs of through grooves formed in the respective lower faces at the sides of the corresponding diametral plane of symmetry parallel to this plane in order to enable them to slide along straight guides of the pallet supports of the turning machine and of the auxiliary stations, and in which the pallets and at least one of the pallet supports have cooperating means constituting the device adapted to move the pallets between the adjacent pallet supports when these guides are at a level above that at which the pallet support of the turning machine is disposed when the piece mounted on the respective pallet is being worked.

Systems of this type are already known in which, adjacent the base of a vertical turning machine on which a rotatable pallet support is mounted, there is located a supplementary base on one end of which is mounted the rotatable pallet support of a control, loading and discharge station, while at the other end thereof there is mounted a pallet support constituted simply by a pair of straight, fixed support guides of a waiting station, and between these two stations an intermediate pallet support constituted by a turntable element, also provided with a pair of support guides.

In known systems of this type, the means constituting the device for moving the pallets between the pallet supports of the turning machine and those of the control and waiting stations are constituted by racks fixed to the lower faces of the pallets in diametral positions equidistant from the respective grooves adapted to fit onto the support guides of the various pallet supports, as well as three driven sprockets, located in the same vertical plane equidistant from the support guides of a turntable element. One of these sprockets projects from the central part of a hollow strut parallel to the support guides of the turntable element, the length of which is greater than that of the said guides and which has opposite end portions normally slightly lower, which carry the remaining two sprockets and which may be raised until the sprockets carried thereby engage from below the racks of the pallet located on the pallet support of an adjacent station. By virtue of this structure it is possible to transfer the pallet carrying the piece already worked from the pallet support of the turning machine to the turntable element and then to the waiting station to enable the subsequent transfer of a pallet carrying the piece to be worked from the control station to the turning station and finally to move the pallet waiting at the waiting station to the control, loading and discharge station, again across the turntable element.

The known structure described above has several serious disadvantages. It is in fact not very reliable because of the difficulty of maintaining correct phasing between the teeth of the sprockets of the turntable element and the racks of the pallets and it cannot be applied to the rotatable pallet support of the turning machine and of the control, loading and discharge station because of considerable longitudinal fixed bulk and because the supply for the drive motor or motors for the sprockets would require the use of rotatable commutators which would have to be located in addition and close to the commutator valves intended to supply pressurised oil to the hydraulic cylinders which effect the movement of the support guides. This imposes limits on the possibilities of varying the configuration of the system of the type considered in order to adapt it to the productional requirements, which vary from time to time.

The object of the present invention is to eliminate the said disadvantages and to provide a system in which the device for moving the pallets between the adjacent pallet supports has characteristics such as to ensure its reliability and to allow its incorporation even in normal rotatable pallet supports of the turning machine and/or of the control loading and discharge station, without normally projecting from their perimeters, thus giving the system a great flexibility while allowing the inclusion of a great number of stations or else rendering the known system simpler.

According to the present invention, this object is achieved by means of a system including at least one vertical turning machine or like machine tool and at least two auxiliary stations, of the type in which the pieces being worked are mounted on pallets having pairs of through grooves formed in the respective lower faces at the sides of the corresponding diametral plane of symmetry parallel to this plane in order to enable them to slide along straight guides of the pallet supports of the turning machine and of auxiliary stations, and in which the pallets and the pallet supports have means constituting the device adapted to move the pallets between the guides of adjacent pallet supports when these guides are at a level above that at which the movable guides of the pallet support of the turning machine are disposed when the piece mounted on the respective pallet is being worked, characterised in that, the device includes a hook member in the form of a T-shaped element projecting from a cursor mounted close to the upper face of at least one of the pallet supports and slidable parallel to the respective guides along a path equidistant from these guides, at least one radial slot is formed in the lower face of the pallet starting from the respective periphery, and is arranged to receive the T-shaped element and which has an inner end portion the width of which corresponds at least to that of the transverse head of the T-shaped element and the length whereof is slightly greater than the thickness of the element; and the device further includes a drive mechanism for imparting movements to the cursor such as to move the T-shaped element between a starting position in which it can engage the slot of the pallet when the latter is located on the pallet support and a final position in which the pallet is located on and centred relative to one of the adjacent pallet supports.

According to a preferred embodiment of the invention, the drive mechanism for imparting the desired movement to the cursor is housed in a diametral through seat formed in the upper face of the pallet support and includes a pair of identical chains driven by pairs of sprockets, one of which is located close to one end of the seat. These sprockets form part of a carriage the part whereof opposite the said end of the seat is fixed to the end of a piston shaft projecting from a hydraulic cylinder fixed to the bottom of the said seat. The cursor is fixed to the upper passes of the chains close to the said end of the said diametral seat and the lower passes of the chains are fixed to the body of the cylinder close to the end thereof from which the shaft projects.

Figure 6:
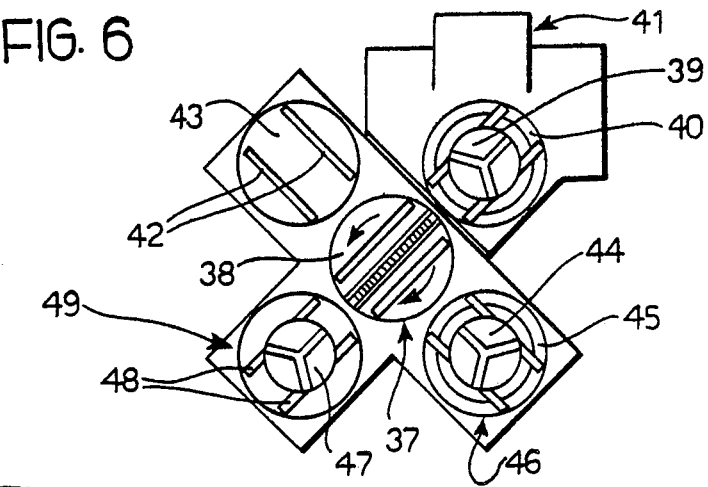
Figure 7:
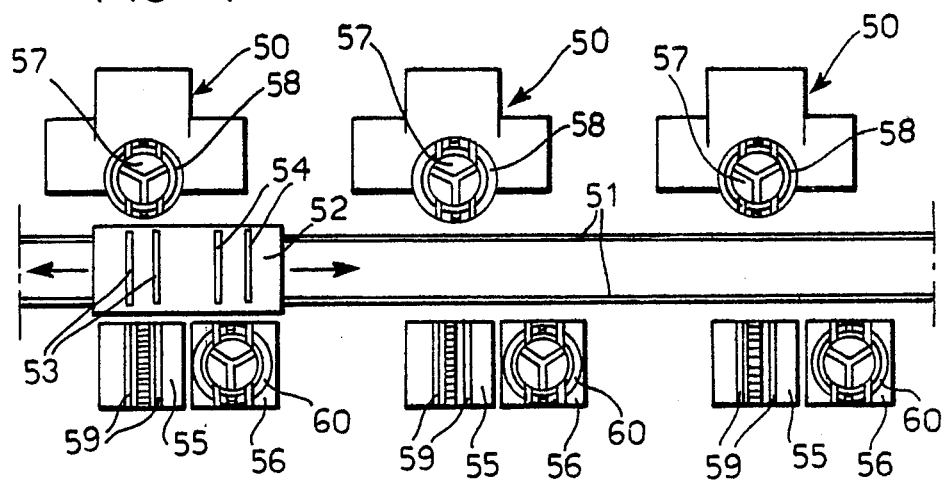
Figure 8:
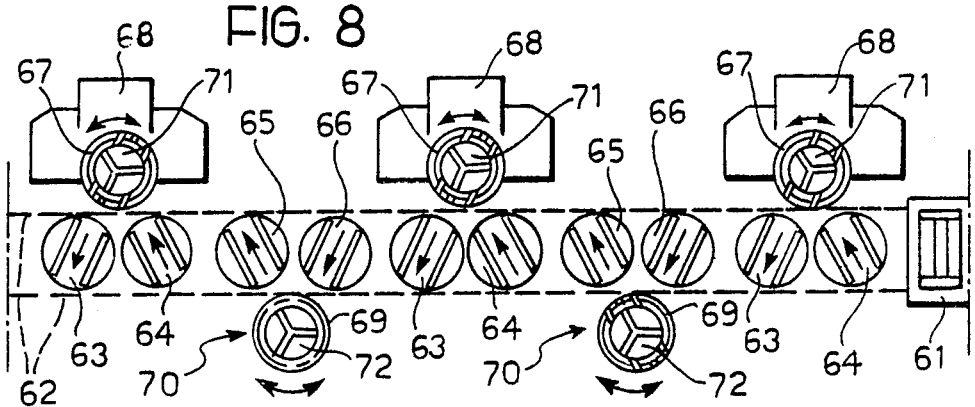

Other characteristics and advantages of the invention will become apparent from the description which follows by way of non-limiting example with reference to several embodiments illustrated in the appended drawings, in which:

FIG. 1 is a schematic, purely diagrammatic perspective view showing the pallets and pallet supports of a system including a vertical turning machine, a control, loading and discharge station and a waiting station, FIG. 2 is a view similar to FIG. 1 showing several details on an enlarged scale, FIG. 3 is a section taken on line III—III of FIG. 2, FIGS. 4 and 5 are partially sectioned elevational views showing the positions of several of the elements illustrated in FIG. 2 in two different operative positions, and FIGS. 6, 7 and 8 are schematic plan views of several alternative embodiments of the system according to the invention.

In FIGS. 1 to 5 corresponding elements are indicated by the same reference numerals.

In the system illustrated in FIGS. 1 and 2, the base of a vertical turning machine is indicated 1 and a control, loading and discharge station or bank and a fixed waiting bank or station are indicated 2 and 3 respectively. Respective pallet supports generally indicated 4 and 5 are mounted on the base 1 of the turning machine and in correspondence with the control station 2 respectively for rotation about vertical axes. Surmounting their flat upper faces 6 are pairs of straight guides 7 located at the sides of diametral planes of the pallet supports (containing their respective axes of rotation) and equidistantly from these planes. These guides 7 are "T" shaped in transverse section and are arranged to engage in grooves 8 of corresponding section formed in the lower faces of a pallet 9 and of a pallet 10, identical to the pallet 9, but disposed, in the example illustrated, at the fixed station 3. Furthermore, each of the guides 7 of the rotatable pallet supports 4 and 5 is fixed to the upper ends of the shafts projecting from a respective pair of hydraulic cylinders 11 arranged to move the guides 7 in known manner between a lower anchoring position in which the pallet engaging the guides 7 is held against bearing and centering blocks 12 and a raised position which the guides of the pallet supports 4 and 5 assume during movement of the pallets between one of the pallet supports and one of the adjoining stations or vice-versa.

In the pallet support 4 there is also formed, in the respective upper face 6, a through groove 13 of U-shaped cross section located in a position equi-distant from the respective guides 7.

To the bottom of the groove 13 there is fixed a hydraulic actuator cylinder 14 which extends from one end of the groove itself and terminates at a certain distance from the other end of the groove 13. Above the cylinder 14 is a pair of chains 15 disposed in vertical planes located close to the opposite side walls of the groove 13, the upper passes 16 of these chains being a small distance from the upper face 6 of the pallet support 4 while their respective lower passes 17 are fixed to the body of the cylinder 14 in correspondence with the end of the cylinder from which the shaft 18 of the respective actuator piston (not illustrated) projects. The chains 15 pass over pairs of rear sprockets 19 and front sprockets 20 rotatably mounted on axles 21 and 22 respectively. The axle 22 is carried by a block 23 fixed to the free end of the shaft 18 projecting from the cylinder 14 and is connected to the rear axle 21 by means of a rod 24 forming therewith a movable frame which can cause the translational movement of the chains 15 upon operation of the cylinder 14. The opposite ends 25 of the axle 22 (see FIG. 3) are inserted in holes formed in parallelipiped rods 26 slidable in guide grooves 27 formed in the side walls of the through groove 13 housing the cylinder 14. These rods 26 terminate at a certain distance from the opposite ends of the groove 13 when the shaft 18 projecting from the cylinder 14 is retracted completely within the cylinder itself, as illustrated in solid outline in FIGS. 1 and 2.

A transverse cursor 28 rests upon and is fixed to the upper passes 16 of the chains 15. The zones of fixing of the cursor 28 to the upper passes 16 of the chains are chosen so that the cursor is close to the sprockets 19 when the shaft 18 is in its retracted position in the cylinder 14. A T-shaped engagement member 29 projects from the upper face of the cursor 28.

By virtue of this structure, upon the operation of the cylinder 14, which causes the shaft 18 to extend outwardly therefrom, the movable frame attached to the chains 15 moves towards and beyond the outer perimeter of the pallet support 4 (as illustrated in broken outline in FIG. 1, which shows a position before the final position). The cursor 28 and the T-shaped member 29 thus move simultaneously towards the axle 22 of the sprockets 20. The parts are proportioned so that this movement may continue until the T-shaped member 29 is released from engagement in a slot 30, also T-shaped in section, of limited length formed in the lower face of the pallet 9 and starting from the outer perimeter of the pallet 9 superimposed, in the example illustrated on the pallet support 5 of the control station 2 and entirely identical with the pallet support 4, except for the absence from the support 5 of the through groove 13 and the drive mechanisms described previously housed in this groove. The slot 30 opens into an arcuate groove 31, of inverted U-shaped cross section, which communicates with the exterior in correspondence with the lower face of the pallet 9, the center of curvature of the groove 31 lying on the axis of rotation of the pallet support 4, for the purposes which will be explained below.

In order for the T-shaped member 29 to be insertable in the slot 30 it is necessary for the guides 7 of the pallet support 5 to be in the lowered position in which the pallet 9 is centered on and fixed to the pallet support 5, and in which the guides 7 are aligned with the guides 7 of the pallet support 4 of the turning machine so that the T-shaped member 29 can reach the position illustrated in FIG. 4.

In order for the pallet 9 to be transferred from the pallet support 5 to the pallet support 4 it is necessary, in the first place, to raise the guides 7 of these pallet supports so as to dispose the transverse head 32 of the T-shaped member 29 below the corresponding part of the slot 30 and to disengage the pallet 9 from the pallet support 5, as illustrated in FIG. 5. The advance of the block 23 towards its outward end of travel position is made possible by the presence of a peripheral recess 100 in the edge of the pallet support 5. At this point the hydraulic cylinder 14 is actuated to retract the shaft 18, thus moving the T-shaped member 29 to the initial position illustrated in solid outline in FIGS. 1 and 2. As a result the pallet 9 will be transferred to the position in which it overlies the pallet support 4 and is substantially centered on the axis of rotation of the latter, with the T-shaped member 29 located close to the end of the slot 30 opposite the periphery of the pallet. The guides 7 are then lowered to clamp the pallet 9 on the pallet support 4, the pallet 9 being centered by the bearing of the latter on the bearing blocks 12 and one can then proceed with the working of a piece 33 clamped between the jaws of the pallet 9 of which one (34), is visible in FIGS. 4 and 5.

Once the working of the piece 33 has been finished, and it is desired to transfer the pallet 9 to the waiting station 3 so that it occupies the position of the pallet 10 illustrated in FIG. 1 (which, naturally, must first be removed), it will be necessary first of all to bring the guides 7 of the pallet support 4 to the raised position and to align them with fixed guides 34a (which are simply rectangular in cross section and located at a level which the guides 7 reach only when they are raised) of the waiting station 3.

Subsequently the hydraulic cylinder 14 is again actuated to effect movement of the T-shaped member 29 to the position in which it is located when it projects to the maximum extent from the perimeter of the pallet support 4 and the pallet 9 is urged by the member 29 onto the guides 34a of the waiting station 3 to a position centered relative to the ends of these guides. The fixed position of these guides 34a does not allow the disengagement of the T-shaped member 29 from the slot 30 of the pallet 9 by a simple reversal of the movement of the shaft 18. However, such disengagement may be effected equally well by rotation of the pallet support 4 in the direction of the arrows 35. During this rotation the member 29 will leave the pallet 9 through the arcuate groove 31 into which the T shaped slot 30 opens.

The transfer of the pallets between the various stations may be facilitated by intermediate guides 36 (see FIGS. 4 and 5) preferably of the disappearing type, which are located at a height corresponding to that at which the guides 7 are located when they are brought to their raised positions.

The invention can be applied equally well to different systems from that illustrated in FIGS. 1 to 5, for example to a system of the type illustrated in FIG. 6.

In this latter there is an intermediate station 37 constituted by a rotatable pallet support 38 substantially identical to the pallet support 4 of the system illustrated in FIGS. 1 to 5, that is, provided with a control mechanism identical to that described above. It may take up a pallet 39 from a pallet support 40 of a turning machine 41 and transfer it to fixed guides 42 of a waiting station 43, then take a pallet 44 from the pallet support 45 of a control station 46 and move it onto the pallet support 40 of the turning machine 41, and finally take a pallet 47 from guides 48 of a second waiting station to the pallet support 45 of the control station 46. The successive operations will not be described in that they are obvious to an expert.

The system illustrated in FIG. 7 includes a plurality of vertical turning machines 50 aligned on one side of a track 51 on which a shuttle 52 is slidable, the shuttle 52 having two pairs of transverse guides 53 and 54 on its upper face. On the other side of the track 51 substantially facing the various turning machines are pairs of waiting stations 55 and control stations 56. The pallet supports of the turning machines and of the stations 55 and 56 each have a control mechanism of the type described above. It is thus possible to move the pallets from the pallet supports 58 of the turning machines 50 onto the guides 53, or 54 of the shuttle 52 and from there onto the fixed guides 59 of one of the waiting stations 55 or onto the pallet supports 60 of the control stations 56 and from the latter onto one of the guides of the shuttle 52 and from these guides to the pallet support 58 of the selected turning machine 50 or to one of the waiting stations 56. It is understood that the level at which the upper faces of the guides 53, 54 and 59 lie, corresponds to that which the guides of the pallet supports 58 and 60 respectively of the turning machines and of the control stations reach when they are raised.

The system according to FIG. 8 differs from that illustrated in FIG. 7 in that, instead of the shuttle slidable on rails on the ground, it includes a lift 61 suspended from an overhead track schematically indicated in broken outline at 62 and located above pairs of fixed waiting banks or stations 63, 64 and 65, 66 respectively, alternating with each other. The respective guides at the stations 63, 64 and 65, 66 are disposed symmetrically in opposite sides of the vertical median planes at the stations and intersect on the axis of rotation of the pallet supports 67 of the turning machines 68 and the pallet supports 69 of the control, loading and discharge stations 70 respectively. This system enables the transfer of pallets 71 mounted on the pallet supports 67 of the turning machines 68 to one of the waiting stations 63 or 64 adjoining the turning machines and of the movement of a pallet 72 from one of the control stations 70 to one of the waiting stations 65 or 66, from which the pallets may be transported towards the free waiting station located close to the turning machine which has finished or is finishing the working of a piece. This transport may be effected by means of a lift 61 movable along the overhead track 62.

Naturally, the principle of the invention remaining the same, its details may be varied widely with respect to that described above and illustrated in the appended drawings without thereby departing from the scope of the present invention, as defined in the appended claims.

Thus for example, in the system illustrated in FIGS. 1 to 5, the waiting station 3 could be replaced by a second control, loading and discharge station entirely identical to the station 2, with considerable advantages as regards the overall productivity.

I claim:

1. In a system including at least one vertical turning machine or like machine tool and at least two auxiliary stations, respective pallets on which pieces being worked are mounted, each pallet having pairs of through grooves in its lower face on opposite sides of the corresponding diametral plane of symmetry and parallel to this plane, and pallet supports at the turning machine and the auxiliary stations, each pallet support having straight guides engageable by said through grooves of said pallets, at least one said pallet support having means for moving said guides, a device for moving the pallets between the guides of adjacent pallet supports, wherein said device includes:

a cursor mounted close to the upper face of at least one of the pallet supports and movable parallel to the respective guides along a path equidistant from said guides;

a T-shaped hook member projecting from said cursor;

means defining at least one radial slot in the lower face of a said pallet, starting from the periphery thereof, and arranged to receive the T-shaped member, said slot having an inner end portion the width of which corresponds at least to that of the transverse head of the T-shaped member and the length of which is slightly greater than the thickness of said member, and a drive mechanism for imparting movements to the cursor such as to move the T-shaped element between a starting position in which it is engageable with said slot of the pallet when the latter is located on the pallet support and a final position in which the pallet is located on and centered relative to one of the adjacent pallet supports, said drive mechanism including a double-acting hydraulic cylinder fixed to the bottom of a diametral through seat formed in the upper face of the pallet support, a piston shaft projecting from said cylinder, a pair of identical chains carrying said cursor pairs of coaxial sprockets over which said chains pass, one of said sprocket pairs being located close to one end of said seat;

the sprockets forming part of a carriage, a part of said carriage opposite the said end of the seat being fixed to the end of the piston shaft of said hydraulic cylinder, and the lower passes of said chains being fixed to the body of the hydraulic cylinder close to the end of the cylinder from which the piston shaft projects.

2. In a system including at least one vertical turning machine or like machine tool and at least two auxiliary stations, respective pallets on which pieces being worked are mounted, each pallet having pairs of through grooves in its lower face on opposite sides of the corresponding diametral plane of symmetry and parallel to this plane, and pallet supports at the turning machine and the auxiliary stations, each pallet support having straight guides engageable by said through grooves of said pallets, at least one said pallet support being rotatable and having means for moving said guides, a device for moving the pallets between the guides of adjacent pallet supports, wherein said device includes:

a cursor mounted close to the upper face of at least one of the pallet supports and movable parallel to the respective guides along a path equidistant from said guides;

a T-shaped hook member projecting from said cursor;

means defining at least one radial slot in the lower face of a said pallet, starting from the periphery thereof, and arranged to receive the T-shaped member;

said slot having an inner end portion the width of which corresponds at least to that of the transverse head of the T-shaped member and the length of which is slightly greater than the thickness of said member;

a drive mechanism for imparting movements to the cursor such as to move the T-shaped element between a starting position in which it is engageable with said slot of the pallet when the latter is located on the pallet support and a final position in which the pallet is located on and centered relative to one of the adjacent pallet supports; and further wherein the pallet support on which the cursor is mounted rotatable, one of the adjacent pallet supports is stationary, and wherein the lower face of the pallet is formed with an arcuate, inverted groove of U-shaped cross section, the inner end portion of said radial slot opening into said arcuate groove, the opposite ends of said groove opening into the periphery of the pallet and the center of curvature of said groove being outside the perimeter of the pallet; the radius of said groove being such that said center coincides with the axis of rotation of the rotatable pallet support when the pallet is located on the stationary pallet support.

3. System as defined in claim 1 or claim 2, wherein two radial grooves are formed in the lower face of the pallet, said grooves extending in the direction of the axis of the pallet from diametrally opposite zones of the periphery of the pallet.

4. System as defined in claim 2, wherein the drive mechanism for imparting movements to the cursor include a double-acting hydraulic cylinder fixed to the bottom of a diametral through seat formed in the upper face of the pallet support, a piston shaft projecting from said cylinder, a pair of identical chains, and pairs of coaxial sprockets over which said chains pass, one of said sprocket pairs being located close to one end of said seat; the sprockets forming part of a carriage the part whereof opposite the said end of the seat is fixed to the end of the piston shaft of said hydraulic cylinder, the cursor being fixed to the upper passes of the chains close to the end of said diametral seat, and the lower passes of said chains being fixed to the body of the hydraulic cylinder close to the end of the latter from which the piston shaft projects.

5. System as defined in claim 1 or claim 4, wherein parallelipiped-shaped rods are slidably mounted in grooves of corresponding shape formed in the side walls of the seat in which said hydraulic cylinder is located, and wherein the sprockets are mounted on axles, and the opposite ends of the axles of one of said sprocket pair are inserted in coaxial apertures formed said rod.

6. System as defined in claim 1 or claim 2, wherein, to facilitate movement of the pallets between the pallet supports of the various stations, the system further includes short intermediate guide portions interposed between the support guides of the adjacent pallet supports between which the pallets are to be moved.

7. System as defined in claim 6, characterised in that the intermediate guide portions are of the disappearing type.

8. System as defined in claim 1 or claim 2, wherein the system further includes a vertical turning machine and two auxiliary stations constituted by control, loading and discharge stations in which the pallet support provided with drive mechanisms for moving the pallets between the various stations is that associated with the turning machine.

9. System as defined in claim 1 or claim 2, and further including a vertical turning machine and four auxiliary stations, specifically an intermediate station, two waiting stations and a control loading and discharge bank or station, the waiting stations and the control station being spaced at intervals around the periphery of the pallet suppoort of the intermediate station which is provided with the T-shaped hook member as well as the drive mechanism for moving the cursor from which the T-shaped member projects.

10. System as claimed in claim 1 or claim 2, and further including a track, a shuttle slidable along the track and a plurality of vertical turning machines disposed on one side of said track, and, for each of the turning machines, two auxiliary stations, a waiting station and a control, loading and discharge station adjacent each other, of which the waiting station has guides perpendicular the track and the shuttle is slidable along the track, being provided on its upper face with two pairs of guides (53 and 54) the spacing of which corresponds to that of the guides with which the pallet supports of the turning machines and of the auxiliary stations are provided; all the pallet supports of the turning machines, the control stations and the waiting stations being provided with T-shaped hook members and drive mechanisms for moving the cursor from which the T-shaped members project, adapted to cooperate with peripheral grooves formed in the pallets of the system.

11. System as defined in claim 1 or claim 2, and further including a lift and overhead conveyor device movable along a path, a plurality of vertical turning machines located on one side of said path and, on the other side of said path, a control, loading and discharge station located between successive said vertical turning machines, each vertical turning machine, and each of the control stations, having associated therewith a pair of waiting stations provided with fixed guides, located on opposite sides of the respective vertical planes of symmetry, which intersect on the axes of the rotatable pallet supports of the turning machines and of those of said control stations respectively; said pallet supports of the turning machine and the control stations having said T-shaped hook members as well as respective said drive mechanisms for effecting movement of the cursors from which said T-shaped members project, arranged to engage in peripheral grooves of corresponding shape formed in said pallets.

12. A machine tool pallet drive apparatus comprising at least one vertical turning machine or like machine tool and at least two auxiliary stations, pallets on which pieces being worked are mounted, each pallet having pairs of through grooves in its lower face on opposite sides of the corresponding diametral plane of symmetry and parallel to this plane, pallets supports at the turning machine and the auxiliary stations, each pallet support having straight guides engageable by said through grooves of said pallets, at least one said pallet support having means for moving said guides in a vertical direction, at least one auxiliary station having fixed guides, and a device on said at least one said pallet support for moving the pallets between the guides of adjacent pallet supports, wherein said device includes a cursor mounted close to the upper face of at least one of the pallet supports and movable parallel to the respective guides along a path equidistant from said guides;

a T-shaped hook member projecting vertically from said cursor;

means defining at least one radial slot in the lower face of a said pallet, starting from the periphery thereof, and arranged to receive the T-shaped member, said slot having an inner end portion the width of which corresponds at least to that of the transverse head of the T-shaped member and the length of which is slightly greater than the thickness of said member, a movable carriage, and drive means for simultaneously moving the carriage and moving the cursor such as to move the T-shaped element along the carriage between a starting position in which it is engageable with said slot of the pallet when the latter is located on the pallet support and a final position in which the pallet support and a final position in which the pallet is located on and centered relative to one of the adjacent pallet supports.

* * * * *

UNITED STATES PATENT AND TRADEMARK OFFICE
CERTIFICATE OF CORRECTION

PATENT NO. : 4,712,283

DATED : December 15, 1987

INVENTOR(S) : Mario Bertorello

It is certified that error appears in the above-identified patent and that said Letters Patent is hereby corrected as shown below:

Column 8, line 68, replace "suppoort" with --support--.

Column 10, line 8, replace "pallets supports" with --pallet supports--.

Column 10, lines 40-41, after "support and" delete "a final position in which the pallet support and".

Signed and Sealed this

Eighth Day of November, 1988

Attest:

DONALD J. QUIGG

Attesting Officer

Commissioner of Patents and Trademarks